(12) United States Patent
Nakasaka

(10) Patent No.: US 10,519,822 B2
(45) Date of Patent: Dec. 31, 2019

(54) INTERNAL COMBUSTION ENGINE

(71) Applicant: TOYOTA JIDOSHA KABUSHIKI KAISHA, Toyota-shi, Aichi-ken (JP)

(72) Inventor: Yukihiro Nakasaka, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/945,329

(22) Filed: Apr. 4, 2018

(65) Prior Publication Data
US 2018/0291777 A1 Oct. 11, 2018

(30) Foreign Application Priority Data
Apr. 11, 2017 (JP) ................. 2017-078375

(51) Int. Cl.
*F02D 15/02* (2006.01)
*F01L 13/08* (2006.01)
(Continued)

(52) U.S. Cl.
CPC ............ *F01L 13/08* (2013.01); *F02B 75/045* (2013.01); *F02D 13/0215* (2013.01); *F02D 13/0234* (2013.01); *F02D 13/0269* (2013.01); *F02D 15/02* (2013.01); *F02D 15/04* (2013.01); *F02D 41/0007* (2013.01); *F02D 41/10* (2013.01); *F02D 23/00* (2013.01); *F02D 2041/001* (2013.01); *F02D 2200/602* (2013.01);
(Continued)

(58) Field of Classification Search
CPC ............ F02D 15/04; F02D 2041/001; F02D 41/0007; F02D 15/00; F02D 13/0203; F02D 2700/03
See application file for complete search history.

(56) References Cited

U.S. PATENT DOCUMENTS 4,630,447 A * 12/1986 Webber ................ F02B 41/06
60/516
6,390,035 B2 5/2002 Moteki et al.
(Continued)

FOREIGN PATENT DOCUMENTS

EP 2 960 471 A1 12/2015
JP 2001-227367 8/2001
(Continued)

*Primary Examiner* — Long T Tran
(74) *Attorney, Agent, or Firm* — Finnegan, Henderson, Farabow, Garrett & Dunner, LLP

(57) ABSTRACT

An internal combustion engine includes a turbocharger, a variable valve timing mechanism, a variable compression ratio mechanism, and an electronic control unit that controls the variable compression ratio mechanism such that the mechanical compression ratio becomes a target mechanical compression ratio and controls the variable valve timing mechanism such that the valve closing timing of the intake valve becomes a target valve closing timing. The electronic control unit brings the target valve closing timing close to an intake bottom dead center and make the target mechanical compression ratio low, compared to a steady state after the intake pressure reaches a target pressure, in a transient state before the intake pressure reaches the target pressure in a case where the intake pressure is increased to the target pressure higher than an atmospheric pressure by the turbocharger.

7 Claims, 12 Drawing Sheets

(51) Int. Cl.
  *F02D 13/02*   (2006.01)
  *F02B 75/04*   (2006.01)
  *F02D 41/10*   (2006.01)
  *F02D 15/04*   (2006.01)
  *F02D 41/00*   (2006.01)
  *F16C 7/06*    (2006.01)
  *F02D 23/00*   (2006.01)

(52) U.S. Cl.
  CPC ...... *F02D 2250/34* (2013.01); *F02D 2700/03* (2013.01); *F16C 7/06* (2013.01); *Y02T 10/142* (2013.01); *Y02T 10/144* (2013.01)

(56) References Cited

U.S. PATENT DOCUMENTS

| | | | |
|---|---|---|---|
| 7,167,789 B1* | 1/2007 | Froloff | F02D 13/0207 |
| | | | 123/305 |
| 7,360,514 B2 | 4/2008 | Rottenkolber et al. | |
| 9,528,437 B2 | 12/2016 | Tanaka | |
| 2004/0112310 A1* | 6/2004 | Osamura | F02B 75/048 |
| | | | 123/48 B |
| 2008/0190406 A1 | 8/2008 | Akihisa et al. | |
| 2012/0031377 A1 | 2/2012 | Okada et al. | |
| 2013/0213035 A1* | 8/2013 | Kamiyama | F02B 75/041 |
| | | | 60/602 |
| 2014/0281336 A1 | 9/2014 | Takahashi et al. | |
| 2015/0122077 A1 | 5/2015 | Melde-Tuczai et al. | |
| 2016/0138441 A1* | 5/2016 | Philippe | F02B 75/04 |
| | | | 123/294 |
| 2016/0177997 A1 | 6/2016 | Ezaki et al. | |
| 2016/0341154 A1* | 11/2016 | Okawa | F02M 26/22 |

FOREIGN PATENT DOCUMENTS

| | | |
|---|---|---|
| JP | 2005-069027 | 3/2005 |
| JP | 2005-090425 | 4/2005 |
| JP | 2012-241625 | 12/2012 |
| JP | 5585527 B2 | 9/2014 |
| JP | 2015-527518 | 9/2015 |
| JP | 2016-118180 | 6/2016 |
| JP | 2016-142137 | 8/2016 |
| WO | WO2010/125694 A1 | 11/2010 |
| WO | WO2013/065397 | 5/2013 |

* cited by examiner

INTERNAL COMBUSTION ENGINE

INCORPORATION BY REFERENCE

The disclosure of Japanese Patent Application No. 2017-078375 filed on Apr. 11, 2017 including the specification, drawings and abstract is incorporated herein by reference in its entirety.

BACKGROUND

1. Technical Field

The present disclosure relates to an internal combustion engine.

2. Description of Related Art

In the related art, it is known that a turbocharger is provided at an internal combustion engine of the Atkinson cycle in which an expansion ratio is made higher than a compression ratio due to late closing or early closing of an intake valve (for example, Japanese Unexamined Patent Application Publication No. 2005-090425 (JP 2005-090425 A)). The turbocharger is driven by exhaust gas to increase intake pressure. The turbocharging performed by the turbocharger increases the intake air amount and increases the output of the internal combustion engine.

However, in a case where the needed load of the internal combustion engine is sharply increased due to acceleration or the like of a vehicle provided with the internal combustion engine, the turbocharging performed by the turbocharger takes substantial time. Therefore, intake air amount cannot be rapidly increased to a target value. The above-described phenomenon is referred to as turbo lag.

In order to reduce the turbo lag, there is a need for increasing exhaust energy. However, when late closing or early closing of the intake valve is performed in the internal combustion engine of the Atkinson cycle, the intake air amount is small. Therefore, the exhaust energy is small. For this reason, in the internal combustion engine described in JP 2005-090425 A, the intake air amount in a transient state is increased by bringing the valve closing timing of the intake valve in the transient state closer to an intake bottom dead center than that in a steady state in order to reduce the turbo lag.

On the other hand, when the valve closing timing of the intake valve is brought close to the intake bottom dead center, the compression ratio becomes high. Therefore, knocking is likely to occur. For this reason, in the internal combustion engine described in JP 2005-090425 A, the valve closing timing of the intake valve is brought close to the intake bottom dead center, and the ignition timing is retarded.

SUMMARY

However, when the ignition timing is retarded, thermal efficiency decreases and the output of the internal combustion engine decreases. Hence, when the ignition timing is retarded in order to prevent the occurrence of knocking as described in JP 2005-090425 A, the fuel efficiency degrades markedly.

The disclosure provides an internal combustion engine that can further suppress degradation of fuel efficiency while further reducing turbo lag.

An aspect of the disclosure relates to an internal combustion engine. The internal combustion engine includes a turbocharger, a variable valve timing mechanism, a variable compression ratio mechanism, and an electronic control unit. The turbocharger is configured to be driven by exhaust gas to increase intake pressure. The variable valve timing mechanism is configured to change a valve closing timing of an intake valve. The variable compression ratio mechanism is configured to change a mechanical compression ratio of the internal combustion engine. The electronic control unit is configured to control the variable compression ratio mechanism such that the mechanical compression ratio becomes a target mechanical compression ratio and to control the variable valve timing mechanism such that the valve closing timing becomes a target valve closing timing. The electronic control unit is configured to bring the target valve closing timing close to an intake bottom dead center and make the target mechanical compression ratio low, compared to a steady state after the intake pressure reaches a target pressure, in a transient state before the intake pressure reaches the target pressure in a case where the intake pressure is increased to the target pressure higher than an atmospheric pressure by the turbocharger.

In the internal combustion engine according to the aspect of the disclosure, the electronic control unit may be configured to calculate a steady valve closing timing that is a target value of the valve closing timing of the intake valve in the steady state, and a transient valve closing timing that is a target value of the valve closing timing of the intake valve in the transient state. The electronic control unit may be configured to calculate the target valve closing timing based on the steady valve closing timing and the transient valve closing timing.

In the internal combustion engine according to the aspect of the disclosure, the electronic control unit may be configured to calculate the transient valve closing timing based on the intake pressure, an engine speed, and a target engine load rate.

In the internal combustion engine according to the aspect of the disclosure, the electronic control unit may be configured to calculate a steady compression ratio that is a target value of the mechanical compression ratio in the steady state, and a transient compression ratio that is a target value of the mechanical compression ratio in the transient state. The electronic control unit may be configured to calculate the target mechanical compression ratio based on the steady compression ratio and the transient compression ratio.

In the internal combustion engine according to the aspect of the disclosure, the electronic control unit may be configured to calculate the transient compression ratio based on the transient valve closing timing, the intake pressure, and an engine speed.

In the internal combustion engine according to the aspect of the disclosure, the electronic control unit may be configured to calculate the target mechanical compression ratio based on the target valve closing timing, an engine speed, and a target engine load rate.

In the internal combustion engine according to the aspect of the disclosure, the electronic control unit may be configured to set the target valve closing timing to the transient valve closing timing when a difference between the transient valve closing timing and the steady valve closing timing becomes equal to or more than a first reference value. The electronic control unit may be configured to switch the target valve closing timing from the transient valve closing timing to the steady valve closing timing when the difference becomes equal to or less than a second reference value smaller than the first reference value.

According to the aspect of the disclosure, it is possible to provide the internal combustion engine that can further suppress degradation of fuel efficiency while further reducing turbo lag.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
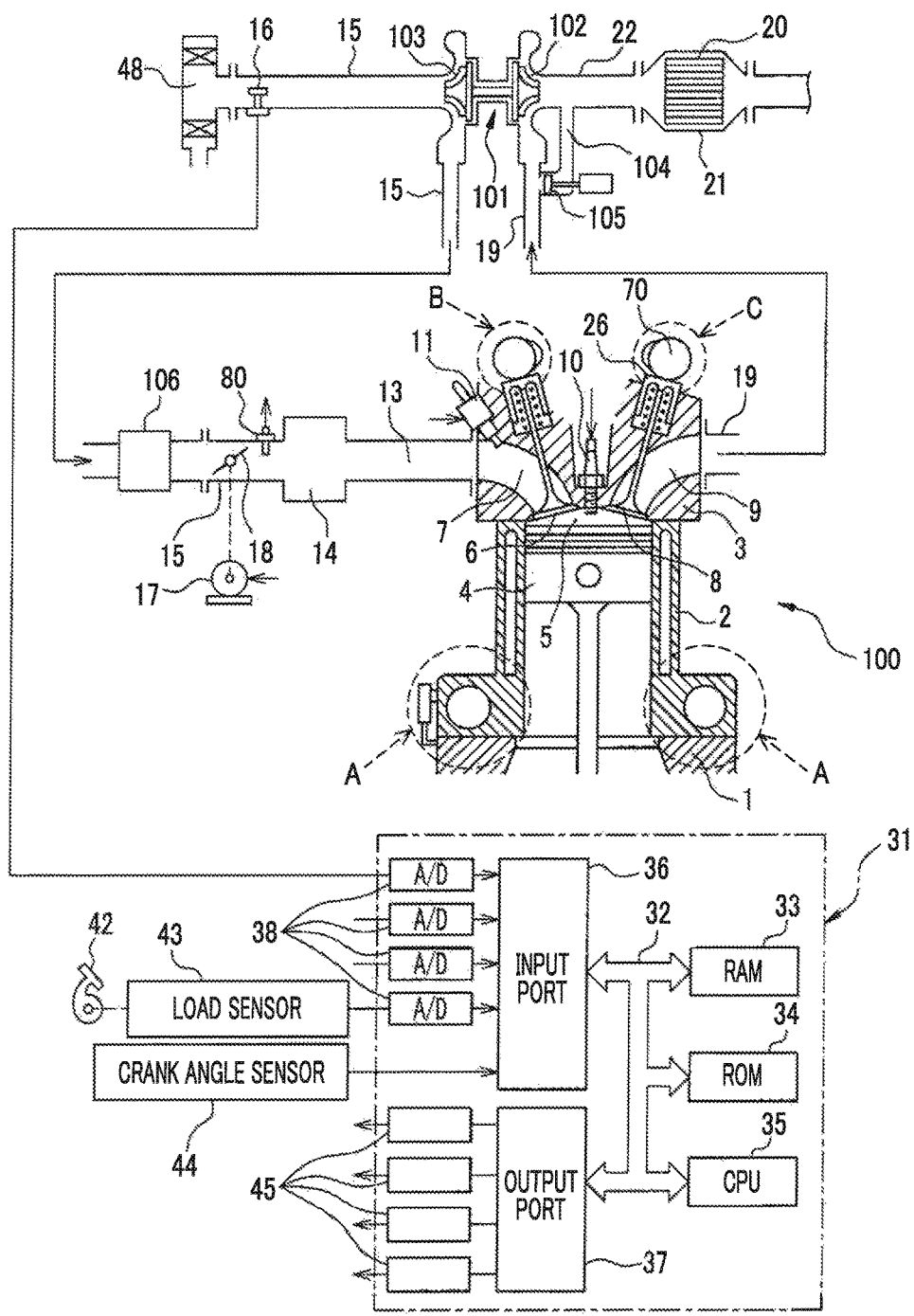
FIG. 1 is a view schematically illustrating an internal combustion engine related to a first embodiment.

Hereinafter, embodiments will be described in detail with reference to the drawings. In the following description, the same constituent elements will be designated by the same reference numerals.

First Embodiment

First, a first embodiment will be described with reference to FIGS. 1 to 13.

Configuration of Internal Combustion Engine

FIG. 1 is a view schematically illustrating an internal combustion engine 100 related to a first embodiment. In the first embodiment, the internal combustion engine 100 is a spark-ignition type internal combustion engine (gasoline engine). The internal combustion engine 100 is mounted on a vehicle. The internal combustion engine 100 includes a crankcase 1, a cylinder block 2, and a cylinder head 3. A piston 4 that reciprocates inside the cylinder block 2 is disposed inside the cylinder block 2. The internal combustion engine 100 has a plurality of cylinders. In the first embodiment, the number of cylinders is four.

A combustion chamber 5 is formed between the piston 4 and the cylinder head 3 for each cylinder. An intake port 7 and an exhaust port 9 are formed in the cylinder head 3. The intake port 7 and the exhaust port 9 are connected to the combustion chamber 5. An intake valve 6 is disposed at an end part of the intake port 7, and is formed to be capable of opening and closing the intake port 7. An exhaust valve 8 is disposed at an end part of the exhaust port 9, and is formed to be capable of opening and closing the exhaust port 9. The internal combustion engine 100 includes a variable valve timing mechanism B that changes a valve opening timing and a valve closing timing of the intake valve 6, and a variable valve timing mechanism C that changes a valve opening timing and a valve closing timing of the exhaust valve 8.

The internal combustion engine 100 includes a fuel injection valve 11 that supplies fuel to the combustion chamber 5, and an ignition plug 10 that ignites an air-fuel mixture in the combustion chamber 5. The fuel injection valve 11 is disposed at a peripheral part of the intake port 7 so as to inject fuel into the intake port 7. That is, the internal combustion engine 100 is a port injection type internal combustion engine. The internal combustion engine 100 may be a cylinder injection type internal combustion engine. In this case, the fuel injection valve 11 is disposed at a peripheral part of an inner wall surface of the cylinder head 3 so as to directly inject fuel into the combustion chamber 5. Gasoline having a stoichiometric air-fuel ratio of 14.6 as fuel is used for the internal combustion engine 100. However, in the internal combustion engine 100, other kinds of fuel may be used.

The internal combustion engine 100 includes a turbocharger 101. The turbocharger 101 includes a turbine 102 disposed at an exhaust passage, a compressor 103 disposed at an intake passage, and a rotating shaft that connects the turbine 102 and the compressor 103 together. When the turbine 102 rotates due to the exhaust gas discharged from the inside of each cylinder to the exhaust passage, the compressor 103 also rotates via the rotating shaft. As a result, the pressure (intake pressure) of the intake air supplied from the intake passage to the inside of the cylinder increases, and an intake air amount increases. Hence, the turbocharger 101 is driven by the exhaust gas to increase the intake pressure.

The intake port 7 of each cylinder is coupled to a surge tank 14 via a corresponding intake branch pipe 13. The surge tank 14 is coupled to an outlet part of the compressor 103 of the turbocharger 101 via an intake pipe 15. A throttle valve 18 driven by a throttle valve driving actuator 17 is disposed inside the intake pipe 15 between the surge tank 14 and the compressor 103. The throttle valve 18 can change the opening area of the intake passage and change the intake air amount by being rotated by the throttle valve driving actuator 17.

A cooler (intercooler) 106 that cools the intake air compressed by the turbocharger 101 is disposed in the intake pipe 15 between the compressor 103 and the throttle valve 18. An inlet part of the compressor 103 is coupled to an air cleaner 48 via the intake pipe 15. The intake port 7, the intake branch pipe 13, the intake pipe 15, and the like form the intake passage that guides air to the combustion chamber 5.

Meanwhile, the exhaust port 9 of each cylinder is coupled to an exhaust manifold 19. The exhaust manifold 19 has a plurality of branch parts coupled to the respective exhaust ports 9, and a collection part in which the branch parts are collected. The collection part of the exhaust manifold 19 is coupled to an inlet part of the turbine 102 of the turbocharger 101. An outlet part of the turbine 102 is coupled to a casing 21 via an exhaust pipe 22. An exhaust gas control catalyst 20 is built in the casing 21. The exhaust port 9, the exhaust manifold 19, the exhaust pipe 22, and the like form the exhaust passage that discharges the exhaust gas, which is produced by the combustion of an air-fuel mixture, from the combustion chamber 5.

A bypass passage 104 that bypasses the turbine 102 is disposed between the exhaust manifold 19 upstream of the turbine 102 and the exhaust pipe 22 downstream of the turbine 102. A waste gate valve 105, which is a bypass valve that opens and closes the bypass passage 104, is disposed in the bypass passage 104. By adjusting the opening degree of the waste gate valve 105, the amount of the exhaust gas that passes through the turbine 102 can be adjusted. Hence, the intake pressure (turbocharging pressure) can be controlled by controlling the opening degree of the waste gate valve 105.

The internal combustion engine 100 includes an electronic control unit (ECU) 31 including a digital computer. The ECU 31 includes a random access memory (RAM) 33, a read-only memory (ROM) 34, and a microprocessor (CPU) 35, an input port 36, and an output port 37 that are mutually connected via bidirectional buses 32. The internal combustion engine 100 is provided with various sensors for detecting the operational state of the internal combustion engine 100, and the output of various sensors is transmitted to the ECU 31. The ECU 31 controls the operational state of the internal combustion engine 100 by controlling various actuators based on the output of the various sensors.

The internal combustion engine 100 includes an air flow meter 16 that detects the intake air amount. The air flow meter 16 is disposed inside the intake pipe 15 between the air cleaner 48 and the compressor 103. An output signal of the air flow meter 16 is input to the input port 36 via a corresponding AD converter 38.

The internal combustion engine 100 includes an accelerator pedal 42, and a load sensor 43 is connected to the accelerator pedal 42. The load sensor 43 generates an output voltage proportional to the stepping amount of the accelerator pedal 42. The output voltage of the load sensor 43 is input to the input port 36 via a corresponding AD converter 38.

The internal combustion engine 100 includes a crank angle sensor 44 that detects an engine speed. The crank angle sensor 44 generates an output pulse whenever a crankshaft rotates, for example, at a predetermined angle, and the output pulse is input to the input port 36. In the CPU 35, the engine speed is calculated from the output pulse of the crank angle sensor 44. A crank angle can be detected depending on the output of the crank angle sensor 44.

The internal combustion engine 100 includes an intake air pressure sensor 80 that detects the intake pressure. The intake air pressure sensor 80 is disposed in the intake passage downstream of the throttle valve 18. In the first embodiment, the intake air pressure sensor 80 is disposed within the intake pipe 15 between the throttle valve 18 and the surge tank 14. The output of the intake air pressure sensor 80 is input to the input port 36 via a corresponding AD converter 38.

The output port 37 of the ECU 31 is connected to the ignition plug 10, the fuel injection valve 11, the throttle valve driving actuator 17, the waste gate valve 105, and the variable valve timing mechanisms B and C via corresponding drive circuits 45. The ECU 31 can control the ignition timing of the ignition plug 10, the fuel injection timing and injection amount of the fuel injection valve 11, the opening degree of the throttle valve 18, the opening degree of the waste gate valve 105, the valve opening timing and valve closing timing of the intake valve 6, the valve opening timing and valve closing timing of the exhaust valve 8.

Variable Compression Ratio Mechanism

The internal combustion engine 100 includes a variable compression ratio mechanism A that changes the mechanical compression ratio of the internal combustion engine 100. The variable compression ratio mechanism A is connected to the output port 37 of the ECU 31, and the ECU 31 controls the variable compression ratio mechanism A. The variable compression ratio mechanism A is provided at a coupling part between the crankcase 1 and the cylinder block 2. The variable compression ratio mechanism A changes the relative positions of the crankcase 1 and the cylinder block 2 in a cylinder axis direction, thereby changing the volume of the combustion chamber 5 when the piston 4 is located at a compression top dead center, to change the mechanical compression ratio of the internal combustion engine 100.

Figure 2:
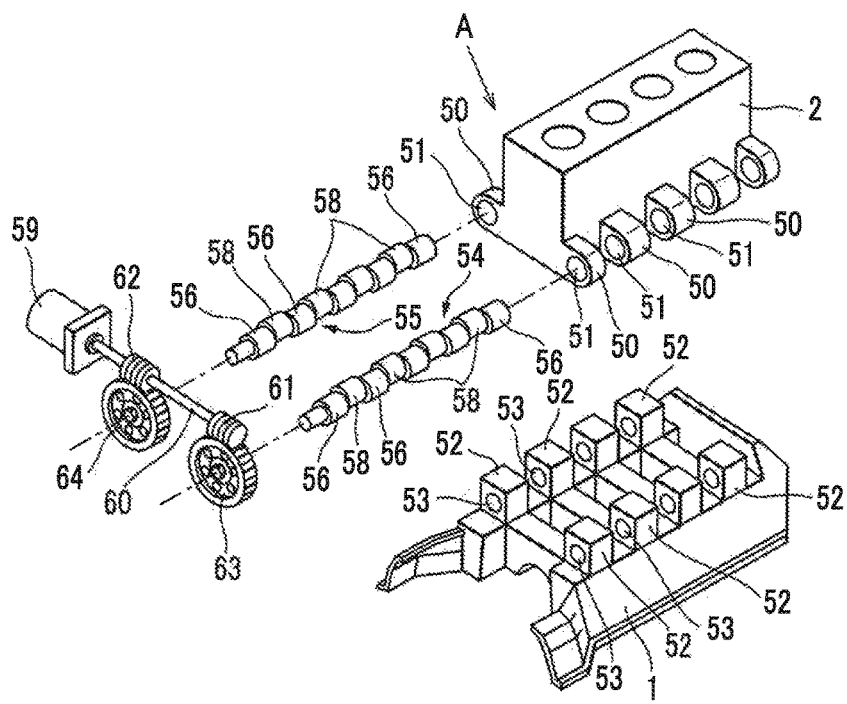
FIG. 2 is an exploded perspective view of a variable compression ratio mechanism.
Figure 3A:
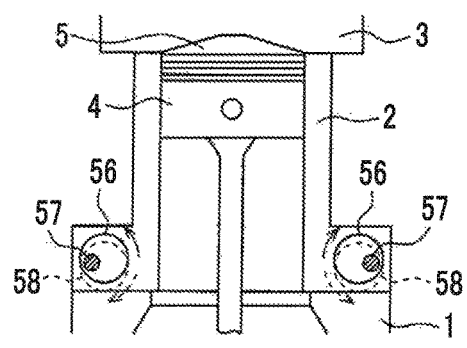
FIG. 3A is a side sectional view of the internal combustion engine that is diagrammatically illustrated.
Figure 3B:
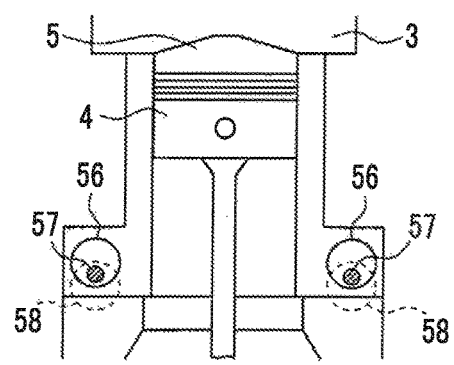
FIG. 3B is a side sectional view of the internal combustion engine that is diagrammatically illustrated.

FIG. 2 illustrates an exploded perspective view of the variable compression ratio mechanism A illustrated in FIG. 1, and FIGS. 3A and 3B illustrate side sectional views of the internal combustion engine 100 that is diagrammatically illustrated. Referring to FIG. 2, a plurality of protruding parts 50 is formed on lower sides of both side walls of the cylinder block 2 such that the protruding parts 50 are spaced apart from each other, and a cam insertion hole 51 having a circular sectional shape is formed within each protruding part 50. Meanwhile, a plurality of protruding parts 52 is formed on an upper wall surface of the crankcase 1 such that the protruding parts 52 are spaced apart from each other and fitted between the corresponding protruding parts 50, and a cam insertion hole 53 having a circular sectional shape is also formed within each protruding part 52.

As illustrated in FIG. 2, a pair of camshafts 54, 55 is provided, and circular cams 56, which are rotatably inserted into the cam insertion holes 51, respectively, are alternately fixed onto each of the camshafts 54, 55. The circular cams 56 are coaxial with the rotational axis of each of the camshafts 54, 55. Meanwhile, as illustrated by hatching in FIGS. 3A and 3B, an eccentric shaft 57, which is eccentrically disposed with respect to the rotational axis of each of the camshafts 54, 55, extends between the circular cams 56, and other circular cams 58 are eccentrically and rotatably attached to the eccentric shaft 57. As illustrated in FIG. 2, each circular cam 58 is disposed between the circular cams 56, and the circular cam 58 is rotatably inserted into each corresponding cam insertion hole 53.

When the circular cams 56 fixed on the camshafts 54, 55, respectively, are rotated in mutually opposite directions as indicated by solid-line arrows in FIG. 3A from a state as illustrated in FIG. 3A, the eccentric shaft 57 moves toward the lower center. Therefore, the circular cams 58 rotate in directions opposite to the circular cams 56 as indicated by dashed-line arrows of FIG. 3A within the cam insertion holes 53. When the eccentric shaft 57 moves to the lower center as illustrated in FIG. 3B, the centers of the circular cams 58 move to below the eccentric shaft 57.

As can be seen by comparing FIG. 3A with FIG. 3B, the relative positions of the crankcase 1 and the cylinder block 2 is determined depending on the distance between the center of each circular cam 56 and the center of each circular cam 58, and the cylinder block 2 is separated from the crankcase 1 as the distance between the center of the circular cam 56 and the center of the circular cam 58 becomes greater. When the cylinder block 2 is separated from the crankcase 1, the volume of the combustion chamber 5 when the piston 4 is located at the compression top dead center increases. On the other hand, when the cylinder block 2 approaches the crankcase 1, the volume of the combustion chamber 5 when the piston 4 is located at the compression top dead center decreases. Hence, by rotating each of the camshafts 54, 55, the volume of the combustion chamber 5 when the piston 4 is located at the compression top dead center can be changed, and the mechanical compression ratio of the internal combustion engine 100 can be linearly (continuously) changed.

As illustrated in FIG. 2, a pair of worm gears 61, 62 with opposite spiral directions is attached to a rotating shaft of a drive motor 59 in order to rotate the camshafts 54, 55 in mutually opposite directions, respectively, and gears 63, 64 that mesh with the worm gears 61, 62, respectively are respectively fixed to end parts of the camshafts 54, 55. In the first embodiment, the volume of the combustion chamber 5 when the piston 4 is located at the compression top dead center can be changed over a wide range by driving the drive motor 59.

Mechanical Compression Ratio and Actual Compression Ratio

As described above, the variable compression ratio mechanism A changes the mechanical compression ratio of the internal combustion engine 100. In the first embodiment, the terms "mechanical compression ratio" and "actual compression ratio" are used in a clearly distinguished manner. Hereinafter, the mechanical compression ratio and the actual compression ratio will be described with reference to FIGS. 4A and 4B.

Figure 4A:
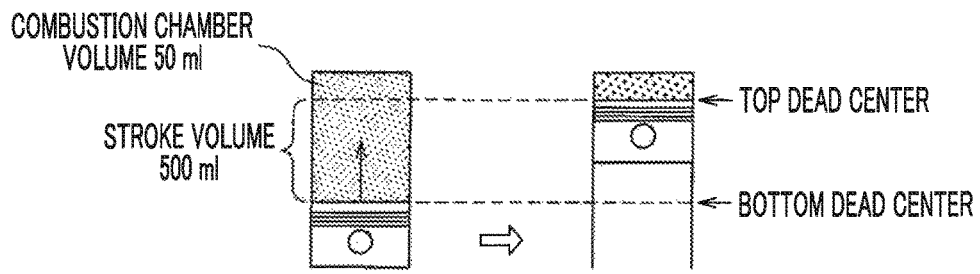
FIG. 4A is a view for describing a mechanical compression ratio.
Figure 4B:
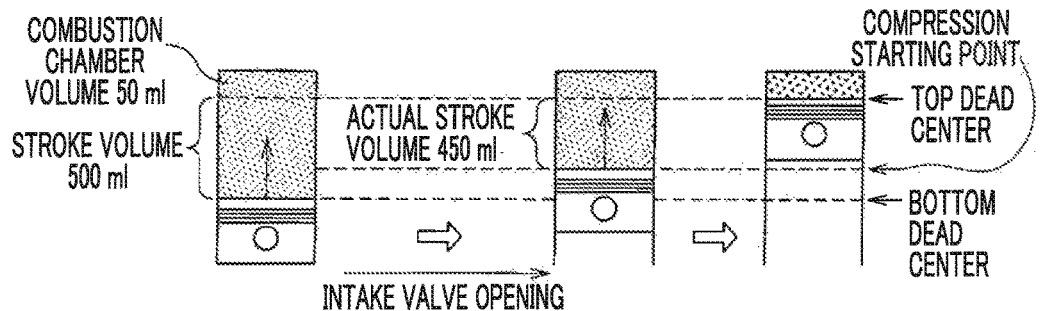
FIG. 4B is a view for describing an actual compression ratio.

FIGS. 4A and 4B are views for describing the mechanical compression ratio and the actual compression ratio. An internal combustion engine having a combustion chamber volume of 50 ml and a piston stroke volume of 500 ml is illustrated for description in FIGS. 4A and 4B. In FIGS. 4A and 4B, the combustion chamber volume represents the volume of a combustion chamber when a piston is located at the compression top dead center.

FIG. 4A illustrates the mechanical compression ratio. The mechanical compression ratio is a value that is mechanically determined from the piston stroke volume and the combustion chamber volume at the time of a compression stroke, and is expressed by (Combustion chamber volume+Stroke volume)/Combustion chamber volume. The mechanical compression ratio is (50 ml+500 ml)/50 ml=11 in the example illustrated in FIG. 4A. The mechanical compression ratio is equal to an expansion ratio.

FIG. 4B illustrates the actual compression ratio. The actual compression ratio is a value that is determined from an actual piston stroke volume until a piston reaches a top dead center since a compression action is actually started, and the combustion chamber volume, and is expressed by (Combustion chamber volume+Actual stroke volume)/Combustion chamber volume. That is, as illustrated in FIG. 4B, no compression action is performed while an intake valve is opened even when the piston begins to move up in a compression stroke, and the actual compression action is started since the intake valve is closed. As a result, the actual compression ratio is (50 ml+450 ml)/50 ml=10 in the example illustrated in FIG. 4B.

In a case where the valve closing timing of the intake valve coincides with an intake bottom dead center, the piston stroke volume and the actual stroke volume are the same. Therefore, the mechanical compression ratio and the actual compression ratio are the same. On the other hand, as illustrated in FIG. 4B, in a case where the valve closing timing of the intake valve is retarded from the intake bottom dead center, the actual piston stroke volume becomes smaller than the piston stroke volume. Therefore, the actual compression ratio becomes smaller than the mechanical compression ratio. Even in a case where the valve closing timing of the intake valve is advanced from the intake bottom dead center, the actual piston stroke volume becomes smaller than the piston stroke volume. Therefore, the actual compression ratio becomes smaller than the mechanical compression ratio. Hence, in a case where the valve closing timing of the intake valve is separated from the intake bottom dead center, the actual compression ratio becomes smaller than the mechanical compression ratio.

Atkinson Cycle

In the internal combustion engine 100, the expansion ratio is made higher than the compression ratio (actual compression ratio) due to the late closing or early closing of the intake valve 6. Hence, the internal combustion engine 100 is an internal combustion engine of the so-called Atkinson cycle. The late closing of the intake valve 6 is performed by retarding the valve closing timing of the intake valve 6 from the intake bottom dead center by the variable valve timing mechanism B. On the other hand, the early closing of the intake valve 6 is performed by advancing the valve closing timing of the intake valve 6 from the intake bottom dead center by the variable valve timing mechanism B. In the internal combustion engine 100, when the late closing or early closing of the intake valve 6 is performed, the mechanical compression ratio is increased by the variable compression ratio mechanism A in order to make the expansion ratio high to enhance thermal efficiency.

Figure 5:
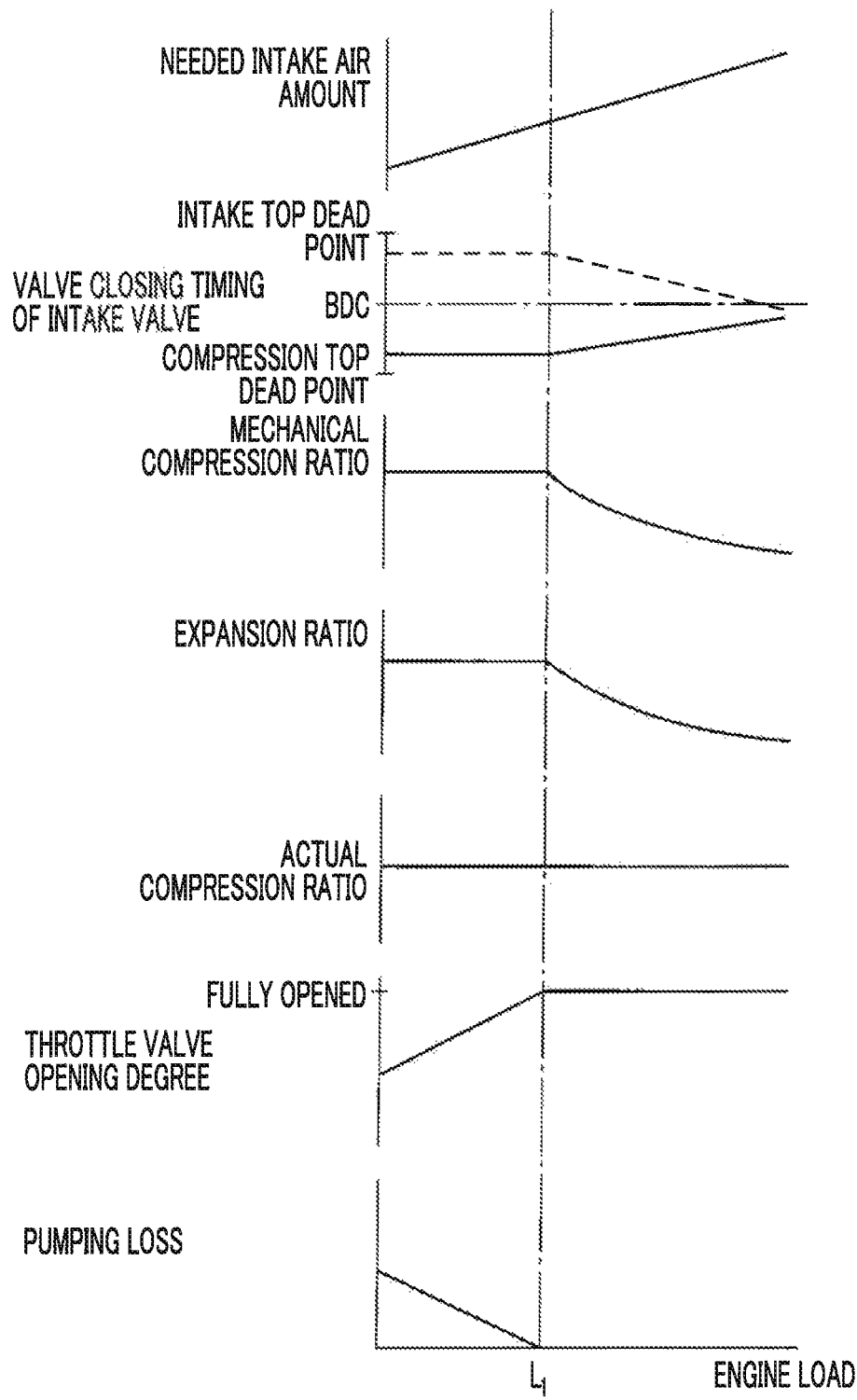
FIG. 5 is a graph illustrating the changes in needed intake air amount and the like according to an engine load.

Hereinafter, the control of the internal combustion engine 100 in a steady state will be described with reference to FIG. 5. FIG. 5 illustrates respective changes in a needed intake air amount, the valve closing timing of the intake valve 6, the mechanical compression ratio, the expansion ratio, the actual compression ratio, the opening degree of the throttle valve 18, and pumping loss according to an engine load. In the graph of the valve closing timing of the intake valve 6, a solid line shows changes in a case where the late closing of the intake valve 6 is performed, and a dashed line shows changes in a case where the early closing of the intake valve 6 is performed. In the example of FIG. 5, the engine speed is kept constant.

As illustrated in FIG. 5, when the engine load is high, the needed intake air amount is large. Therefore, the throttle valve 18 is fully opened or substantially fully opened, and as illustrated by the solid line in FIG. 5, the valve closing timing of the intake valve 6 is advanced toward an intake bottom dead center BDC. Since the throttle valve 18 is kept fully opened or substantially fully opened, the pumping loss is zero. When the engine load, and therefore the needed intake air amount, are maximum, the valve closing timing of the intake valve 6 is slightly retarded more than the intake bottom dead center BDC in consideration of the inertia force of the intake air.

When the engine load is high, the mechanical compression ratio is made low in order to offset an increase in the actual compression ratio resulting from the advance of the valve closing timing of the intake valve 6 to prevent the occurrence of knocking. As a result, the expansion ratio also becomes low.

On the other hand, when the engine load becomes low, the needed intake air amount decreases. For this reason, in order to reduce the intake air amount, the valve closing timing of the intake valve 6 is retarded as illustrated by a solid line in FIG. 5. The mechanical compression ratio is increased as the engine load becomes low such that the actual compression ratio is kept substantially constant. Hence, the expansion ratio is also increased as the engine load becomes low. In this case, the intake air amount is controlled by changing the valve closing timing of the intake valve 6 without changing the opening degree of the throttle valve 18. For this reason, even in this case, where the throttle valve 18 is kept fully opened or substantially fully opened, the pumping loss is zero.

Hence, when the engine load becomes low from a state where the engine load is high, the mechanical compression ratio is increased as the needed intake air amount decreases. That is, the volume of the combustion chamber 5 when the piston 4 reaches the compression top dead center in proportion to a decrease in the intake air amount is reduced.

When the engine load becomes lower, the mechanical compression ratio is further increased. When the engine load decreases to a medium load $L_1$, the mechanical compression ratio reaches a maximum limit mechanical compression ratio that becomes a structural upper limit of the combustion chamber 5. When the mechanical compression ratio reaches the maximum limit mechanical compression ratio in the engine load $L_1$, the mechanical compression ratio is maintained at the maximum limit mechanical compression ratio in a region having a lower load than the engine load $L_1$. Hence, the mechanical compression ratio and the expansion ratio become the maximum in the region having a lower load than the engine load $L_1$.

On the other hand, in the example of FIG. 5, when the engine load decreases to $L_1$, the valve closing timing of the intake valve 6 becomes a limit valve closing timing at which the intake air amount to be supplied into the combustion chamber 5 can be controlled. When the valve closing timing of the intake valve 6 reaches the limit valve closing timing in the engine load $L_1$, the valve closing timing of the intake valve 6 is maintained at the limit valve closing timing in the region having a lower load than the engine load $L_1$.

When the valve closing timing of the intake valve 6 is maintained at the limit valve closing timing, it is not possible to control the intake air amount by changing the valve closing timing of the intake valve 6. For this reason, in the region having a lower load than the engine load $L_1$, the intake air amount is controlled by changing the opening degree of the throttle valve 18, and the opening degree of the throttle valve 18 is made smaller as the engine load becomes low. For this reason, the pumping loss increases as the engine load becomes low.

As illustrated by a dashed line in FIG. 5, the intake air amount may be reduced by advancing the valve closing timing of the intake valve 6 from the intake bottom dead center BDC as the engine load becomes low.

Turbocharging Request

Meanwhile, in a case where a needed load increases sharply due to the acceleration of the vehicle provided with the internal combustion engine 100, or the like, the turbocharging (an increase in the intake pressure) performed by the turbocharger 101 is needed in order to increase the intake air amount. In this case, since the engine load of the internal combustion engine 100 becomes high, a target value of the valve closing timing of the intake valve 6 in the steady state is brought close to the intake bottom dead center, and a target value of the mechanical compression ratio in the steady state is made low.

However, in a transient state where a transition is made from a non-turbocharging state to a turbocharging state, delay of an increase in the intake pressure, that is, so-called turbo lag occurs. In the first embodiment, the following control is executed in order to further reduce the turbo lag.

Control in Transient State

The internal combustion engine 100 includes the electronic control unit that controls the variable compression ratio mechanism A and the variable valve timing mechanism B. The electronic control unit controls the variable compression ratio mechanism A such that the mechanical compression ratio becomes a target mechanical compression ratio, and controls the variable valve timing mechanism B such that the valve closing timing of the intake valve 6 becomes a target valve closing timing. In the first embodiment, the ECU 31 is equivalent to the electronic control unit.

In the first embodiment, the target valve closing timing of the intake valve 6 in the transient state is brought closer to the intake bottom dead center than the target valve closing timing of the intake valve 6 in the steady state in order to rapidly increase the intake air amount to further reduce the turbo lag. In a case where the early closing of the intake valve 6 is performed in order to realize the Atkinson cycle, the target valve closing timing of the intake valve 6 in the transient state is retarded from the target valve closing timing of the intake valve 6 in the steady state. On the other hand, in a case where the late closing of the intake valve 6 is performed in order to realize the Atkinson cycle, the target valve closing timing of the intake valve 6 in the transient state is advanced from the target valve closing timing of the intake valve 6 in the steady state.

As the valve closing timing of the intake valve 6 approaches the intake bottom dead center, the actual compression ratio becomes high and knocking is likely to occur. For this reason, in order to suppress an increase in the actual compression ratio to prevent the occurrence of knocking, the mechanical compression ratio in the transient state is made lower than the mechanical compression ratio in the steady state.

Hence, in the first embodiment, in a case where the intake pressure is increased to a target pressure higher than the atmospheric pressure by the turbocharger 101, the electronic control unit brings the target valve closing timing close to the intake bottom dead center and makes the target mechanical compression ratio low, in the transient state before the intake pressure reaches the target pressure, compared to the steady state after the intake pressure reaches the target pressure. The target pressure means a target value of the intake pressure in the steady state.

Description of Control Using Time Chart

Figure 6:
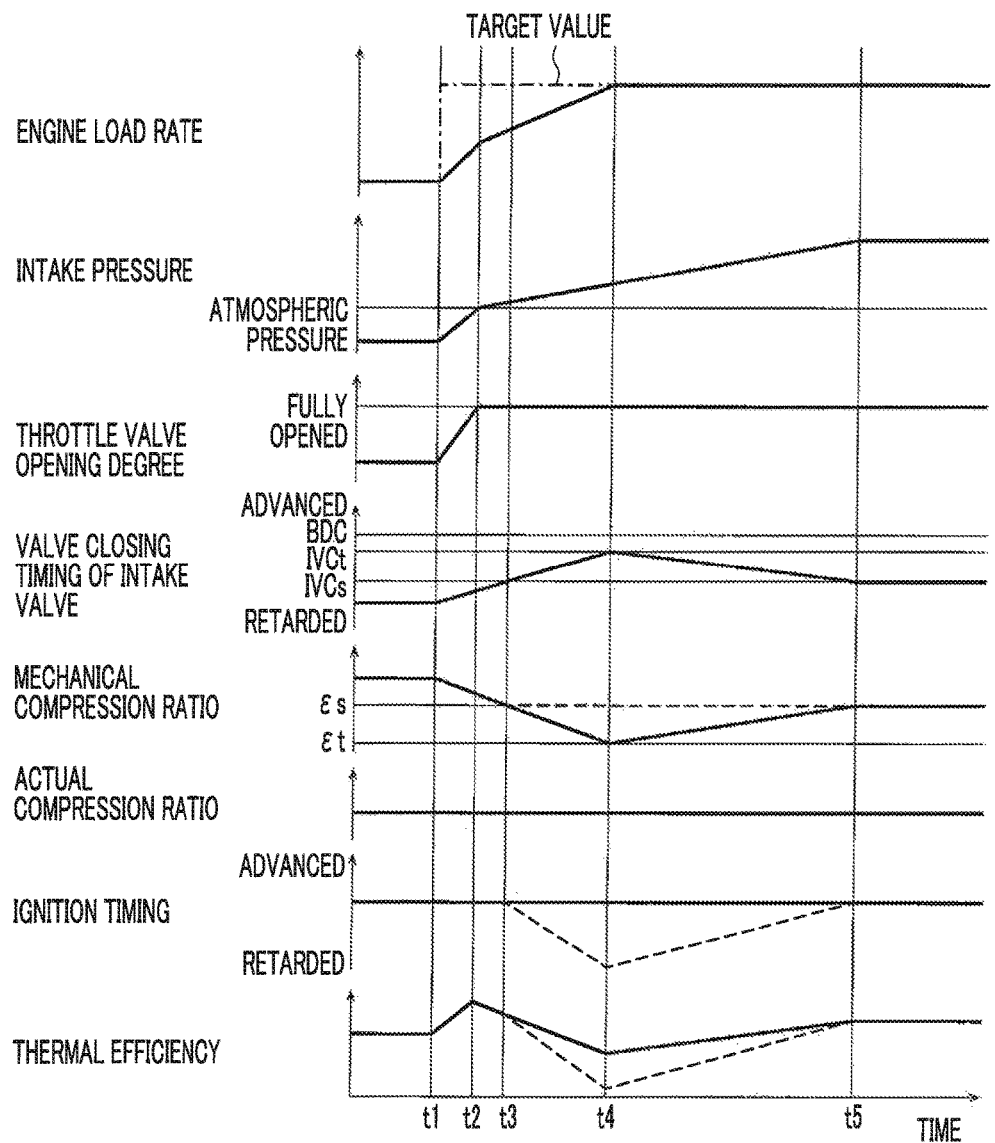
FIG. 6 is a time chart of an engine load rate and the like when turbocharging is performed.

Hereinafter, the control when the turbocharging is performed will be specifically described with reference to FIG. 6. FIG. 6 is a time chart of the engine load rate, the intake pressure, the opening degree of the throttle valve 18, the valve closing timing of the intake valve 6, the mechanical compression ratio, the actual compression ratio, the ignition timing of the ignition plug 10, and the thermal efficiency when the turbocharging is performed. The engine speed is fixed in the example of FIG. 6. The engine load rate is a value showing the ratio of a current intake air amount to a maximum value of the intake air amount corresponding to the engine speed, and is calculated based on the intake air amount and the engine speed. The intake pressure is the pressure of the intake air that flows through the intake passage downstream of the throttle valve 18.

First, the control in the first embodiment illustrated by solid lines will be described. In the example of FIG. 6, before time t1, the engine load rate is low and the valve closing timing of the intake valve 6 is retarded more greatly than the intake bottom dead center BDC. Hence, in the example of FIG. 6, the Atkinson cycle is realized by the late closing of the intake valve 6.

At time t1, as the needed load of the internal combustion engine 100 rapidly increases and as illustrated by a one-dot chain line, the target value of the engine load rate increases greatly. As a result, the turbocharging is needed, and the control of the valve closing timing of the intake valve 6 and the mechanical compression ratio is started.

The target value of the valve closing timing of the intake valve 6 in the transient state is set to a transient valve closing timing IVCt, and the target value of the valve closing timing of the intake valve 6 in the steady state is set to the steady valve closing timing IVCs. The transient valve closing timing IVCt is a value obtained by being advanced from the steady valve closing timing IVCs, that is, a value closer to the intake bottom dead center BDC than the steady valve closing timing IVCs. The target value of the mechanical compression ratio in the transient state is set to a transient compression ratio εt, and the target value of the mechanical compression ratio in the steady state is set to a steady compression ratio εs. The transient compression ratio εt is a value lower than the steady compression ratio εs. The transient compression ratio εt is set such that the actual compression ratio in the transient state becomes the same as the actual compression ratio in the steady state in order to prevent knocking from occurring in the transient state.

In order to increase the intake air amount, the opening degree of the throttle valve 18 is increased at time t1. At time t2, the throttle valve 18 is fully opened, and the intake pressure reaches the atmospheric pressure. From time t1 to time t2, as the opening degree of the throttle valve 18 becomes large, the pumping loss decreases. Therefore, the thermal efficiency increases. After time t2, the opening degree of the throttle valve 18 is kept fully opened.

Thereafter, at time t4, the valve closing timing of the intake valve 6 reaches the transient valve closing timing IVCt, and the mechanical compression ratio reaches the transient compression ratio εt. The engine load rate reaches the target value. From time t2 to time t4, since the mechanical compression ratio decreases in a state where the pumping loss is constant (substantially zero), the thermal efficiency decreases. Meanwhile, since the valve closing timing of the intake valve 6 is greatly advanced, the intake pressure is rapidly increased and the turbo lag is reduced.

Even after time t4, the intake pressure continues increasing toward the target value due to the turbocharging performed by the turbocharger 101. After time t4, the valve closing timing of the intake valve 6 is gradually retarded such that the engine load rate and therefore the intake air amount become constant. That is, the valve closing timing of the intake valve 6 is gradually separated from the intake bottom dead center BDC. The mechanical compression ratio is made gradually high such that the actual compression ratio becomes constant. As a result, the thermal efficiency becomes gradually high.

Thereafter, at time t5, the intake pressure reaches the target pressure. The valve closing timing of the intake valve 6 reaches the steady valve closing timing IVCs, and the mechanical compression ratio reaches the steady compression ratio εs. After time t5, the values of the respective parameters are maintained. In the example of FIG. 6, a period of time t1 to time t5 is the transient state, and a period after time t5 is the steady state.

Portions that are different from the control in the first embodiment will be described regarding control in a comparative example illustrated by dashed lines. In the comparative example, when the advance amount of the valve closing timing of the intake valve 6 is increased in the transient state, the ignition timing is retarded instead of the mechanical compression ratio being made low in order to prevent knocking from occurring.

For this reason, when the mechanical compression ratio reaches the steady compression ratio εs at time t3, the mechanical compression ratio is maintained at the steady compression ratio εs after time t3. When the valve closing timing of the intake valve 6 is advanced from the steady valve closing timing IVCs to the transient valve closing timing IVCt from time t3 to time t4, the ignition timing is retarded in order to prevent the occurrence of knocking. After time t4, when the valve closing timing of the intake valve 6 is gradually retarded toward the steady valve closing timing IVCs, the ignition timing is gradually advanced correspondingly.

When the ignition timing is retarded in the transient state as in the comparative example, as illustrated in FIG. 6, the thermal efficiency decreases greatly compared to a case where the mechanical compression ratio is made lower than that in the steady state like the first embodiment. Hereinafter, the reasons will be described.

Figure 7:
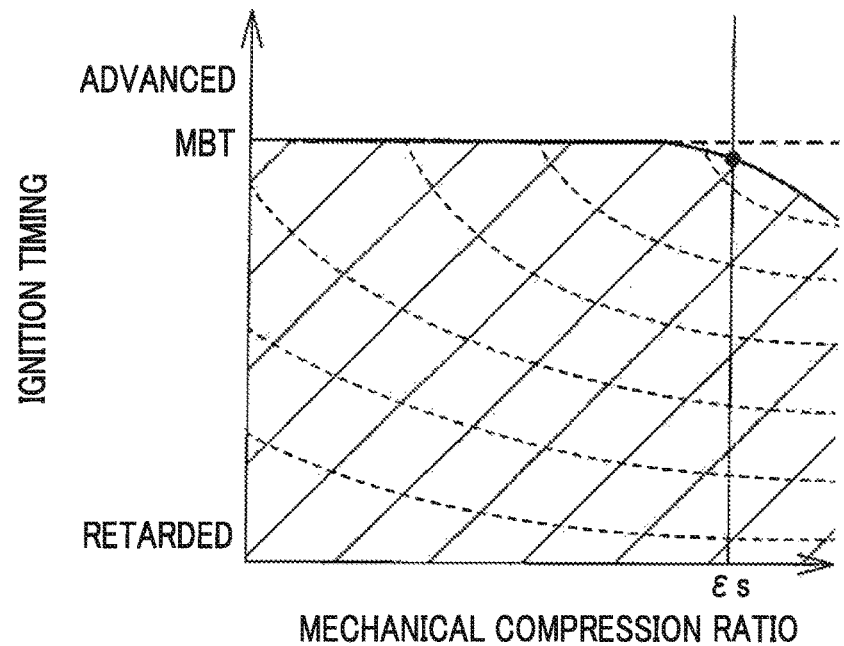
FIG. 7 is a graph illustrating a region where no knocking occurs when changing the ignition timing and a mechanical compression ratio in a state where the valve closing timing of an intake valve is set to a steady valve closing timing.

FIG. 7 is a graph illustrating a region where no knocking occurs when changing the ignition timing and the mechanical compression ratio in a state where the valve closing timing of the intake valve 6 is set to the steady valve closing timing IVCs. In the graph of FIG. 7, the region where no knocking occurs is illustrated by hatching. The ignition timing MBT is the ignition timing at which combustion torque becomes the maximum.

In the graph of FIG. 7, regions where the thermal efficiency becomes equal are illustrated by contour lines of dashed lines. The thermal efficiency of the internal combustion engine 100 becomes relatively high in an upper right region and becomes relatively low in a lower left region. That is, the thermal efficiency becomes higher as the ignition timing is closer to the ignition timing MBT, and becomes higher as the mechanical compression ratio is higher.

The target values of the mechanical compression ratio and the ignition timing in the steady state are plotted in the graph of FIG. 7. The target value of the mechanical compression ratio in the steady state is set to the steady compression ratio εs. The target value of the ignition timing in the steady state is set to a value slightly retarded from the ignition timing MBT such that no knocking occurs.

Figure 8:
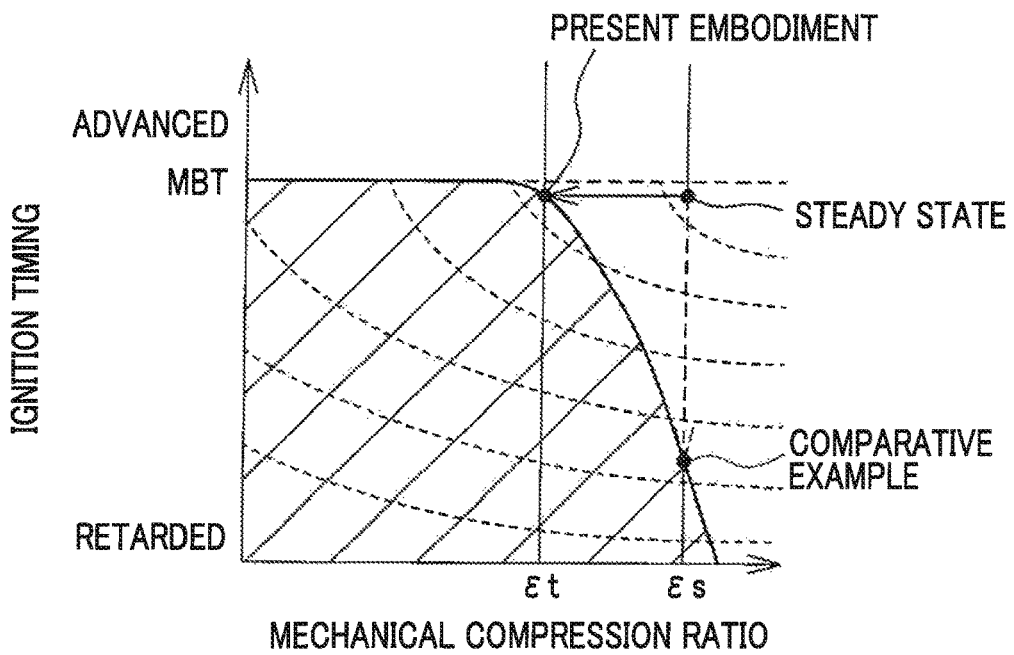
FIG. 8 is a graph illustrating a region where no knocking occurs when changing the ignition timing and the mechanical compression ratio in a state where the valve closing timing of the intake valve is set to a transient valve closing timing.

FIG. 8 is a graph illustrating a region where no knocking occurs when changing the ignition timing and the mechanical compression ratio in a state where the valve closing timing of the intake valve 6 is set to the transient valve closing timing IVCt. Similar to FIG. 7, in the graph of FIG. 8, a region where no knocking occurs is illustrated by hatching, and regions where the thermal efficiency becomes equal are illustrated by contour lines of dashed lines. The target values of the mechanical compression ratio and the ignition timing in the steady state, the target values of the mechanical compression ratio and the ignition timing in the transient state in the first embodiment, the target value of the mechanical compression ratio and the ignition timing in the transient state in the comparative example are plotted in the graph of FIG. 8.

The transient valve closing timing IVCt is closer to the intake bottom dead center BDC than the steady valve closing timing IVCs. Therefore, in a case where the mechanical compression ratio is constant, the actual compression ratio in the transient state becomes higher than the actual compression ratio in the steady state. For this reason, as can be seen from FIG. 7, knocking occurs in a case where the target value of the mechanical compression ratio and the ignition timing in the transient state are set to the same values as those in the steady state.

In the first embodiment, in order to prevent the occurrence of knocking, the mechanical compression ratio in the transient state is made lower than that in the steady state as illustrated by a solid-line arrow. On the other hand, in the comparative example, in order to prevent the occurrence of knocking, the target value of the ignition timing in the transient state is retarded from that in the steady state as illustrated by a dashed-line arrow.

As can be seen from FIG. 8, when the ignition timing is retarded in the transient state as in the comparative example, the thermal efficiency decreases greatly compared to a case where the mechanical compression ratio is made lower than that in the steady state like the first embodiment. Hence, in the first embodiment, a decrease in the thermal efficiency and therefore degradation of fuel efficiency can be suppressed further by making the mechanical compression ratio in the transient state low, while further reducing the turbo lag by bringing the valve closing timing of the intake valve 6 in the transient state close to the intake bottom dead center.

Description of Control Using Flowchart

Figure 9:
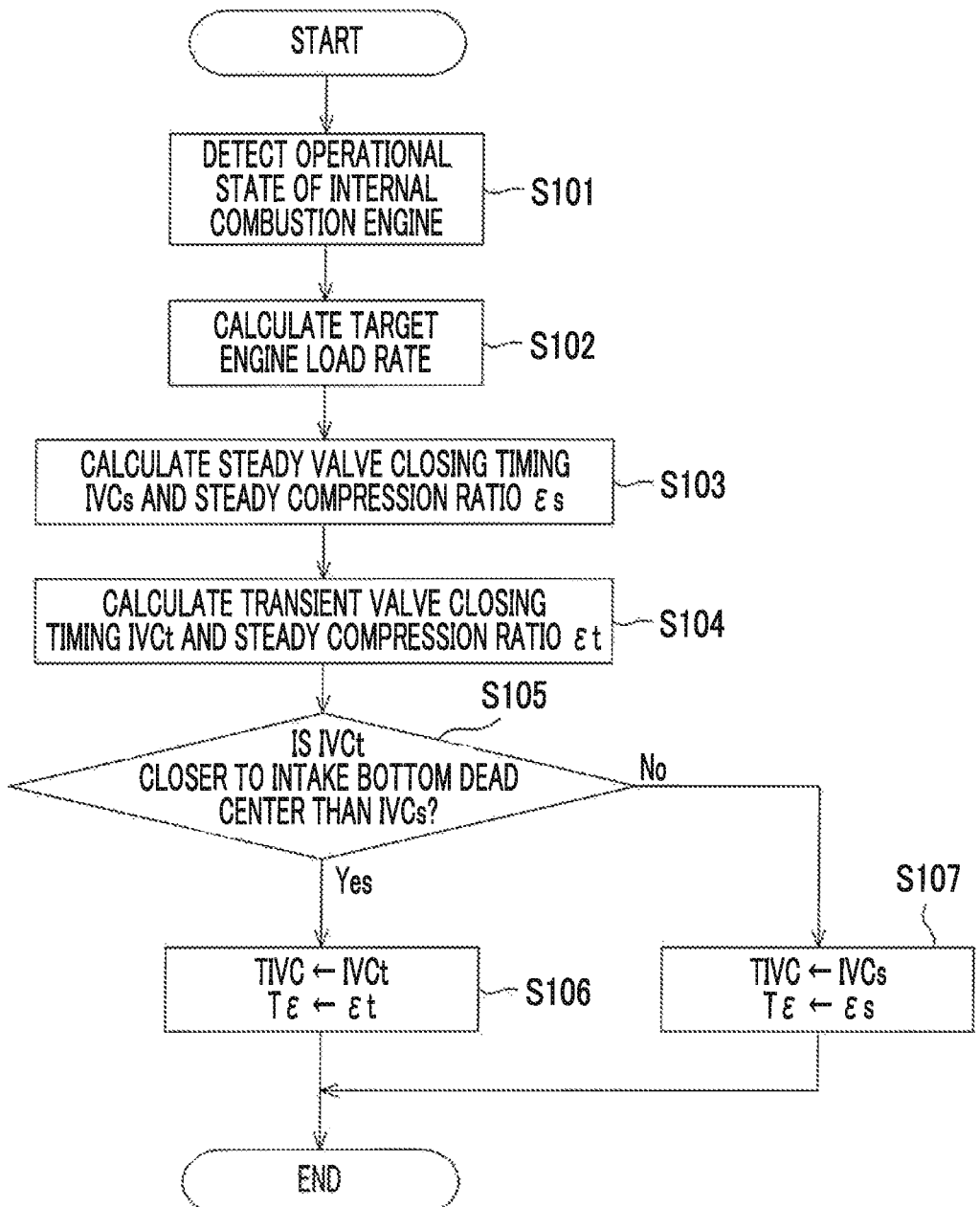
FIG. 9 is a flowchart illustrating the control in the first embodiment.

Hereinafter, the control for setting the target values of the valve closing timing of the intake valve 6 and the mechanical compression ratio in the first embodiment will be described with reference to FIG. 9. FIG. 9 is a flowchart illustrating the control in the first embodiment. A control routine of FIG. 9 is repeatedly executed at predetermined time intervals by the ECU 31 after the starting of the internal combustion engine 100.

First, in Step S101, the operational state of the internal combustion engine 100 is detected. Specifically, the engine speed, the opening degree of the accelerator pedal 42, and the intake pressure are detected. The engine speed is detected by the crank angle sensor 44. The opening degree of the accelerator pedal 42 is detected by the load sensor 43. The intake pressure is detected by the intake air pressure sensor 80. The intake pressure may be estimated from the operational state of the internal combustion engine 100, or the like. For example, the intake pressure (turbocharging pressure) may be calculated by a well-known model calculation as described in Japanese Unexamined Patent Application Publication No. 2012-241625 (JP 2012-241625 A). In Step S102, the target value (target engine load rate) of the engine load rate is calculated based on the opening degree of the accelerator pedal 42.

Figure 10:
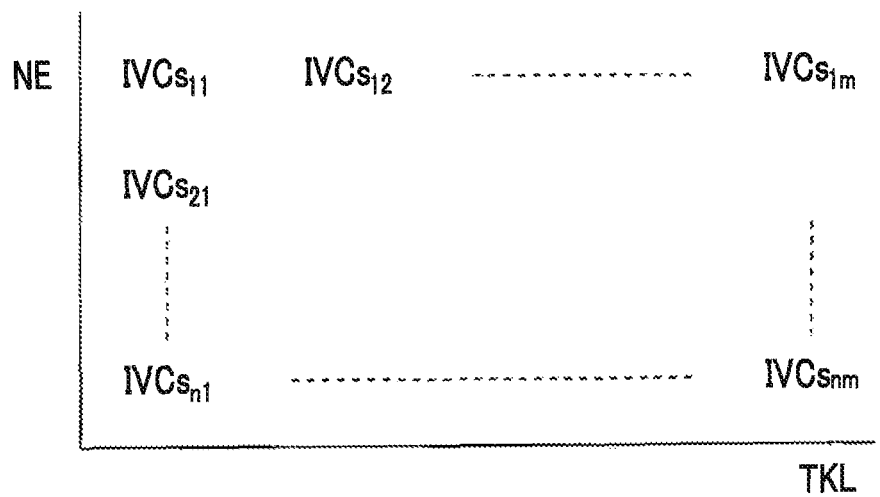
FIG. 10 is a map for calculating the steady valve closing timing.

In Step S103, the target value (steady valve closing timing IVCs) of the valve closing timing of the intake valve 6 in the steady state and the target value (steady compression ratio εs) of the mechanical compression ratio in the steady state are calculated. The steady valve closing timing IVCs is calculated based on the engine speed and the target engine load rate. The steady valve closing timing IVCs is brought closer to the intake bottom dead center as the engine speed is low, and is brought closer to the intake bottom dead center as the target engine load rate is higher. The steady valve closing timing IVCs is calculated using, for example, a map or a calculation formula. The map or the calculation formula is stored, for example, in a ROM 34 of the ECU 31. In the map, as illustrated in FIG. 10, the steady valve closing timing IVCs is expressed as a function of an engine speed Ne and a target engine load rate TKL.

Figure 11:
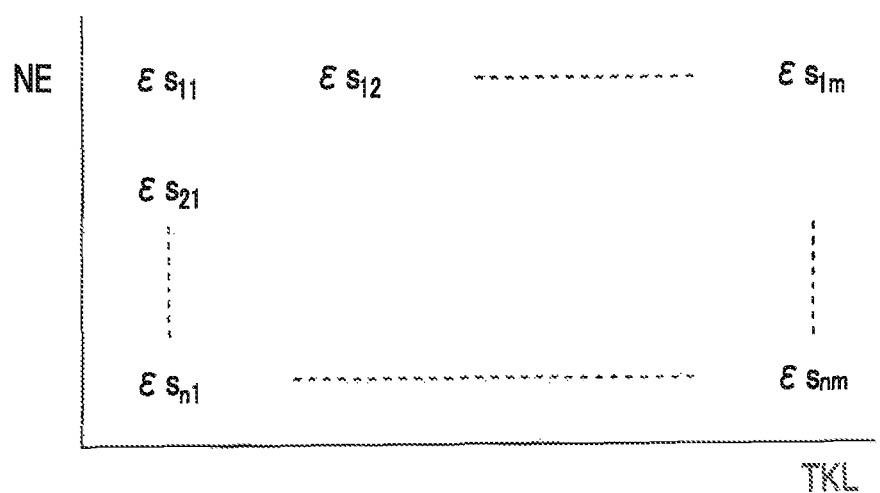
FIG. 11 is a map for calculating a steady compression ratio.

The steady compression ratio εs is calculated based on the engine speed and the target engine load rate. The steady compression ratio εs is made lower as the engine speed is lower, and is made lower as the target engine load rate is higher. The steady compression ratio εs is calculated using, for example, a map or a calculation formula. The map or the calculation formula is stored, for example, in the ROM 34 of the ECU 31. In the map, as illustrated in FIG. 11, the steady compression ratio εs is expressed as a function of the engine speed Ne and the target engine load rate TKL. The steady compression ratio εs may be calculated based on the steady valve closing timing IVCs. In this case, the steady compression ratio εs is made lower as the steady valve closing timing IVCs is closer to the intake bottom dead center.

Figure 12:
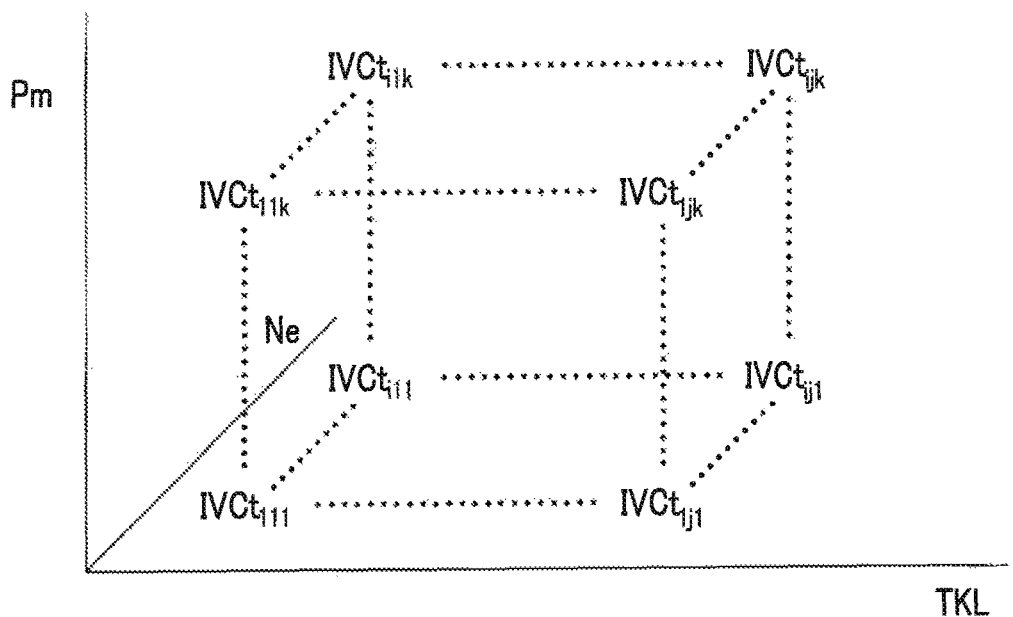
FIG. 12 is a map for calculating the transient valve closing timing.

In Step S104, the target value (transient valve closing timing IVCt) of the valve closing timing of the intake valve 6 in the transient state and the target value (transient compression ratio εt) of the mechanical compression ratio in the transient state are calculated. The transient valve closing timing IVCt is calculated based on the intake pressure, the engine speed, and the target engine load rate. The transient valve closing timing IVCt is brought closer to the intake bottom dead center as the intake pressure is lower, is brought closer to the intake bottom dead center as the engine speed is lower, and is brought closer to the intake bottom dead center as the target engine load rate is higher. The transient valve closing timing IVCt is brought closer to the intake bottom dead center than the steady valve closing timing IVCs in a case where the intake pressure is low with respect to the target engine load rate and the turbocharging is needed. The transient valve closing timing IVCt is calculated using, for example, a map or a calculation formula. The map or the calculation formula is stored, for example, in the ROM 34 of the ECU 31. In the map, as illustrated in FIG. 12, the transient valve closing timing IVCt is expressed as a function of an intake pressure Pm, the engine speed Ne and the target engine load rate TKL.

Figure 13:
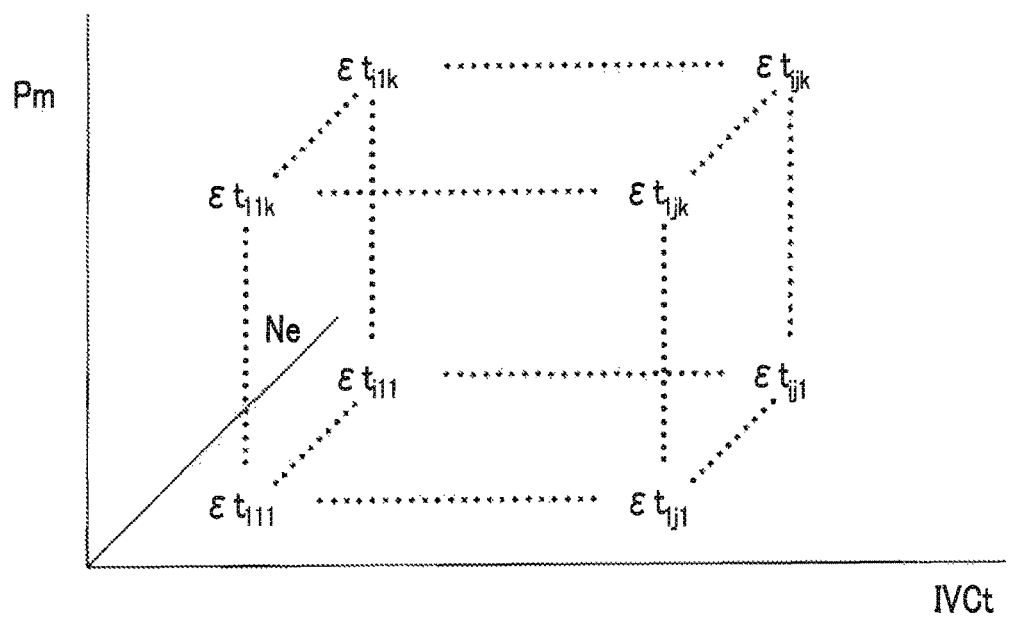
FIG. 13 is a map for calculating a transient compression ratio.

The transient compression ratio εt is calculated based on the intake pressure, the engine speed, and the transient valve closing timing IVCt. The transient compression ratio εt is made lower as the intake pressure is higher, is made lower as the engine speed is lower, and is made lower as the transient valve closing timing IVCt is closer to the intake bottom dead center. The transient compression ratio εt is made lower than the steady compression ratio εs in a case where the transient valve closing timing IVCt is closer to the intake bottom dead center than the steady valve closing timing IVCs. The transient compression ratio at is calculated using, for example, a map or a calculation formula. The map or the calculation formula is stored, for example, in the ROM 34 of the ECU 31. In the map, as illustrated in FIG. 13, the transient compression ratio εt is expressed as a function of the intake pressure Pm, the engine speed Ne, and the transient valve closing timing IVCt.

In Step S105, whether or not the transient valve closing timing IVCt is closer to the intake bottom dead center than the steady valve closing timing IVCs is determined. In a case where the transient valve closing timing IVCt is closer to the intake bottom dead center than the steady valve closing timing IVCs, that is, in a case where the correction of the valve closing timing caused by turbocharging delay is requested, the control routine of FIG. 9 proceeds to Step S106. In Step S106, the target value (target valve closing timing TIVC) of the valve closing timing of the intake valve 6 is set to the transient valve closing timing IVCt, and the target value (target mechanical compression ratio Tε) of the mechanical compression ratio is set to the transient compression ratio εt. The control routine of FIG. 9 ends after Step S106.

On the other hand, in a case where the transient valve closing timing IVCt is the same as the steady valve closing timing IVCs, that is, in a case where the correction of the valve closing timing caused by the turbocharging delay is not requested, the control routine of FIG. 9 proceeds to Step S107. In Step S107, the target valve closing timing TIVC is set to the steady valve closing timing IVCs, and the target mechanical compression ratio Tε is set to the steady compression ratio s. The control routine of FIG. 9 ends after Step S107.

Second Embodiment

The configuration and control of an internal combustion engine related to a second embodiment are basically the same as those of the internal combustion engine related to the first embodiment except for the points to be described below. For this reason, the second embodiment will be described below, mainly regarding the parts different from the first embodiment.

In the second embodiment, similar to the first embodiment, the electronic control unit of the internal combustion engine 100 calculates the steady valve closing timing IVCs and the transient valve closing timing IVCt, and calculates the target valve closing timing based on the steady valve closing timing IVCs and the transient valve closing timing IVCt. Unlike the first embodiment, the electronic control unit calculates the target mechanical compression ratio based on the target valve closing timing.

Figure 14:
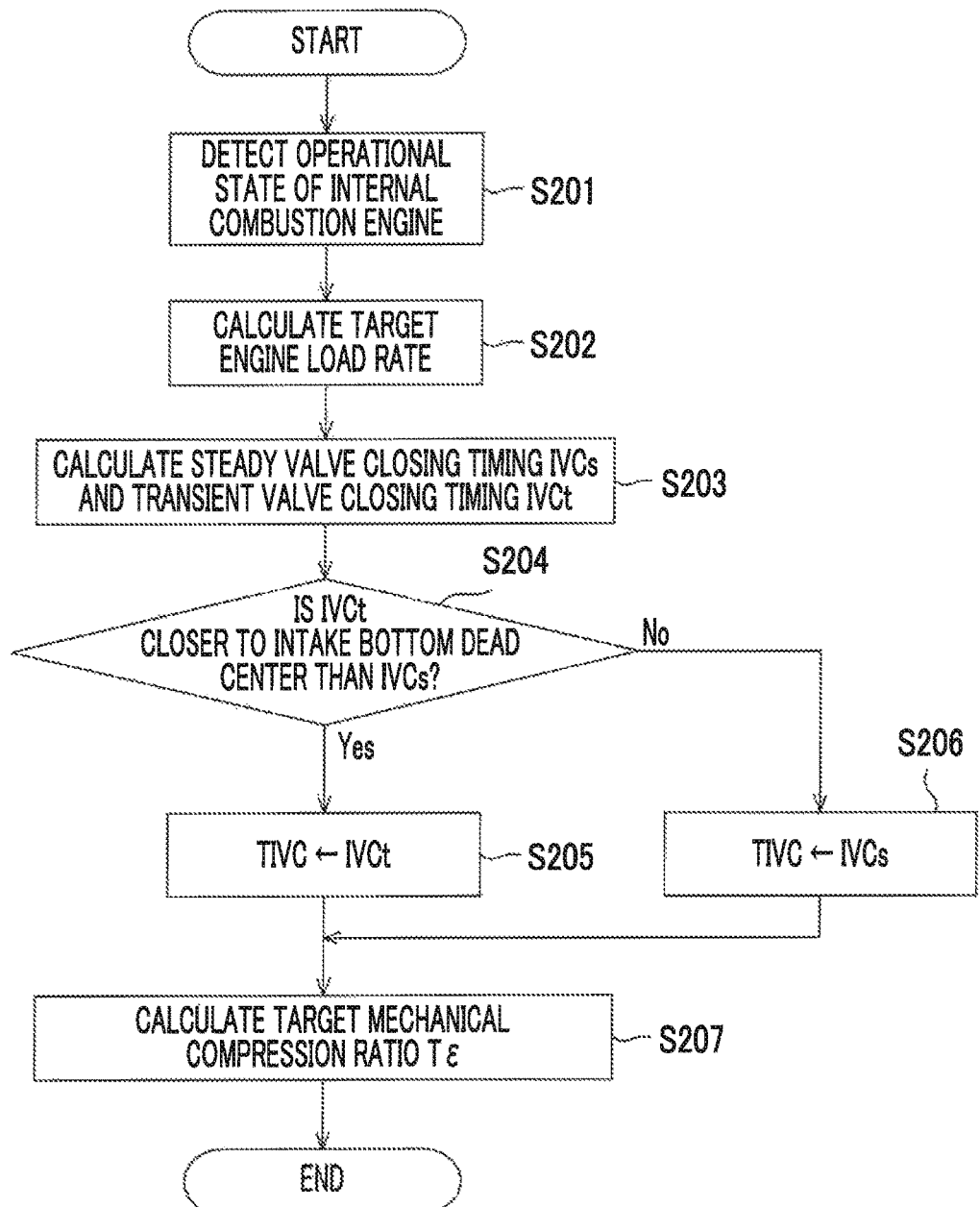
FIG. 14 is a flowchart illustrating the control in a second embodiment.

FIG. 14 is a flowchart illustrating the control in the second embodiment. A control routine of FIG. 14 is repeatedly executed at predetermined time intervals by the ECU 31 after the starting of the internal combustion engine 100. Since Step S201 and Step S202 are the same as Step S101 and Step S102 in FIG. 9, the description thereof will be omitted.

In Step S203, the steady valve closing timing IVCs and the transient valve closing timing IVCt are calculated. The steady valve closing timing IVCs and the transient valve closing timing IVCt are calculated by the same method as the first embodiment.

In Step S204, whether or not the transient valve closing timing IVCt is closer to the intake bottom dead center than the steady valve closing timing IVCs is determined. In a case where the transient valve closing timing IVCt is closer to the intake bottom dead center than the steady valve closing timing IVCs, the control routine of FIG. 14 proceeds to Step S205. In Step S205, the target valve closing timing TIVC is set to the transient valve closing timing IVCt. On the other hand, in a case where the transient valve closing timing IVCt is the same as the steady valve closing timing IVCs, the control routine of FIG. 14 proceeds to Step S206. In Step S206, the target valve closing timing TIVC is set to the steady valve closing timing IVCs.

Figure 15:
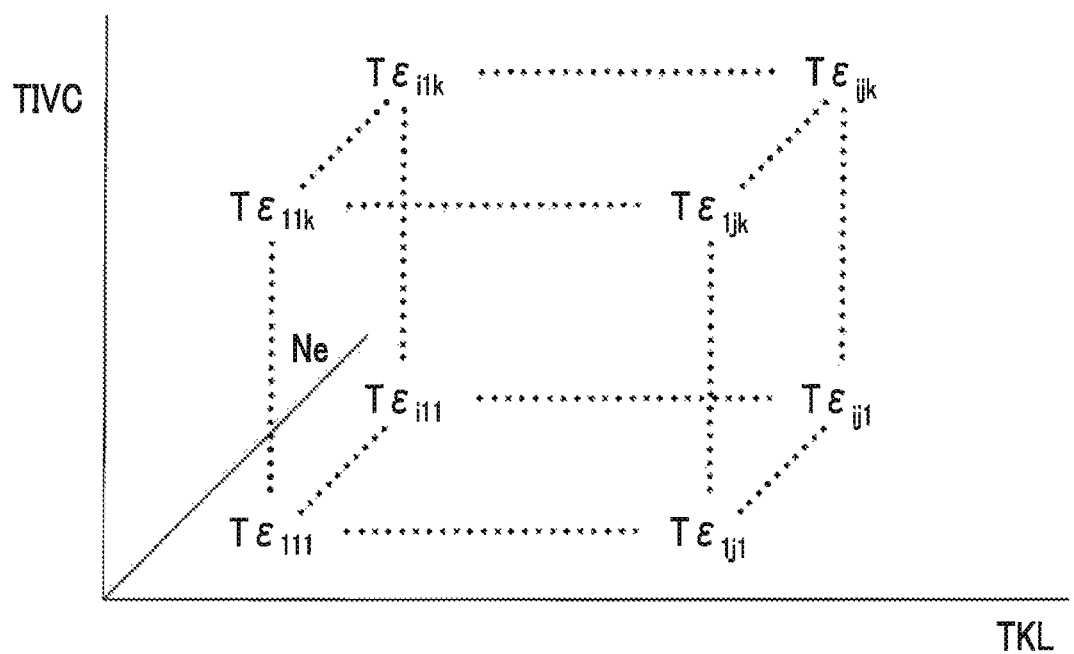
FIG. 15 is a map for calculating a target mechanical compression ratio.

The control routine of FIG. 14 proceeds to Step S207 after Step S205 or Step S206. In Step S207, the target mechanical compression ratio Tε is calculated. The target mechanical compression ratio Tε is calculated based on the target valve closing timing TIVC set in Step S205 or Step S206, the engine speed, and the target engine load rate. The target mechanical compression ratio Tε is made lower as the target valve closing timing TIVC is closer to the intake bottom dead center, is made lower as the engine speed is lower, and is made lower as the target engine load rate is higher. The target mechanical compression ratio Tε is calculated using, for example, a map or a calculation formula. The map or the calculation formula is stored, for example, in the ROM 34 of the ECU 31. In the map, as illustrated in FIG. 15, the target mechanical compression ratio Tε is expressed as a function of the target valve closing timing TIVC, the engine speed Ne, and the target engine load rate TKL. The control routine of FIG. 14 ends after Step S207.

In the second embodiment, the number of maps can be reduced as compared to the control in the first embodiment in which the target mechanical compression ratio Tε is calculated based on the steady compression ratio εs and the transient compression ratio εt. For this reason, the capacity of the ROM 34 of the ECU 31 and the calculation load of the CPU 35 of the ECU 31 can be reduced.

Third Embodiment

The configuration and control of an internal combustion engine related to a third embodiment are basically the same as those of the internal combustion engine related to the first embodiment except for the points to be described below. For this reason, the third embodiment will be described below mainly regarding the parts different from the first embodiment.

In the third embodiment, the electronic control unit of the internal combustion engine 100 sets the target valve closing timing TIVC to the transient valve closing timing IVCt when a difference between the transient valve closing timing IVCt and the steady valve closing timing IVCs becomes equal to or more than a first reference value, and switches the target valve closing timing TIVC from the transient valve closing timing IVCt to the steady valve closing timing IVCs when the difference between the transient valve closing timing IVCt and the steady valve closing timing IVCs becomes equal to or less than a second reference value. Hence, the electronic control unit of the internal combustion engine 100 sets the target valve closing timing TIVC to the transient valve closing timing IVCt until the difference between the transient valve closing timing IVCt and the steady valve closing timing IVCs becomes equal to or less than the second reference value after the difference becomes equal to or more than the first reference value. The first reference value and the second reference value are determined in advance, and are set such that the second reference value becomes smaller than the first reference value. The first reference value and the second reference value are larger values than zero.

Figure 16:
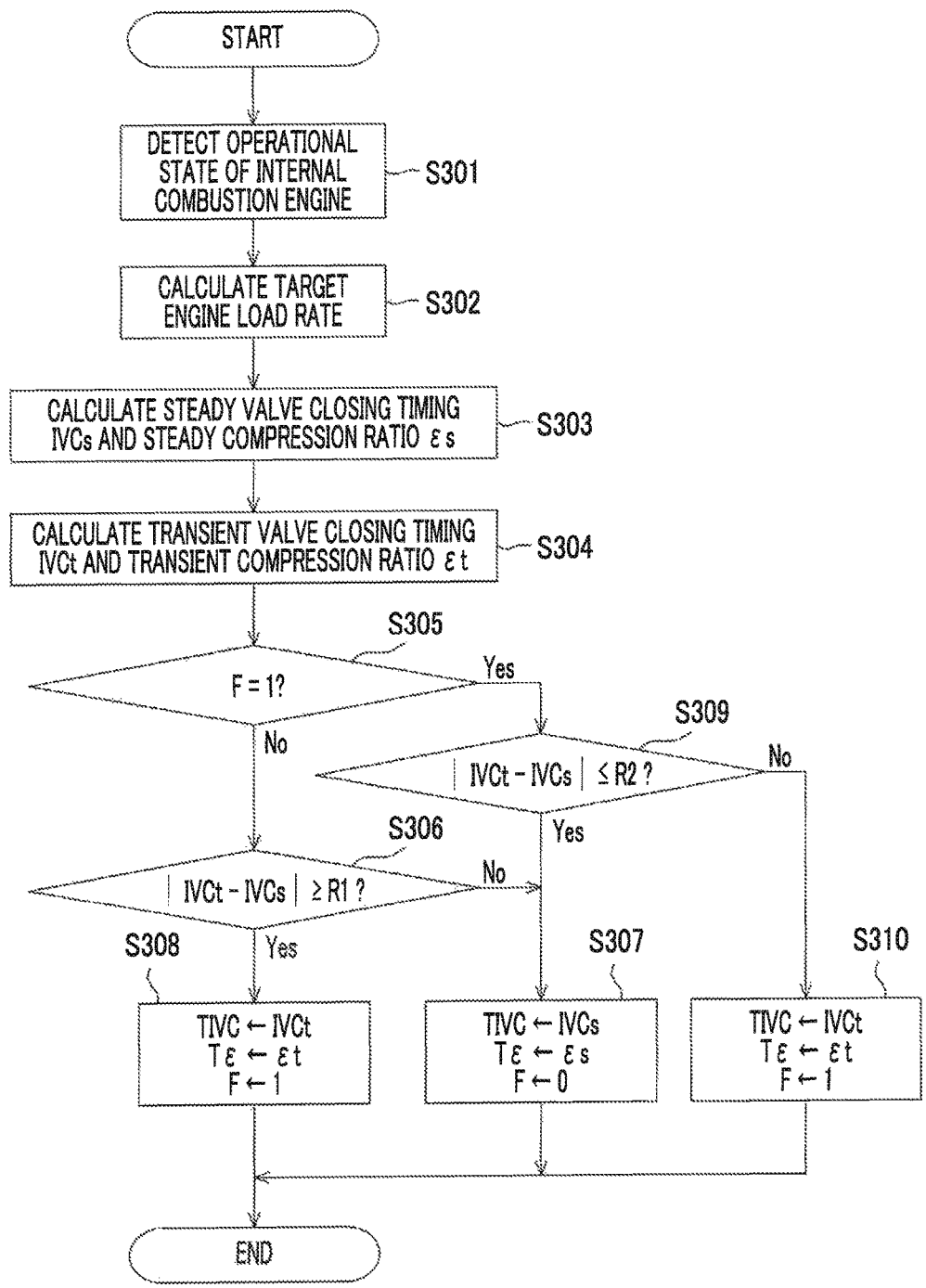
FIG. 16 is a flowchart illustrating the control in a third embodiment.

FIG. 16 is a flowchart illustrating the control in the third embodiment. A control routine of FIG. 16 is repeatedly executed at predetermined time intervals by the ECU 31 after the starting of the internal combustion engine 100. Since Step S301 to Step S304 are the same as Step S101 to Step S104 in FIG. 9, the description thereof will be omitted.

In Step S305 after Step S304, whether or not a valve closing timing setting flag F is 1 is determined. The valve closing timing setting flag F is a flag that is set to 1 in a case where the target valve closing timing TIVC is set to the transient valve closing timing IVCt in the previous control routine and is set to zero in a case where the target valve closing timing TIVC is set to the steady valve closing timing IVCs in the previous control routine. In a case where the valve closing timing setting flag F is determined to be set to zero in Step S305, that is, in a case where the target valve closing timing TIVC is set to the steady valve closing timing IVCs in the previous control routine, the control routine of FIG. 16 proceeds to Step S306.

In Step S306, whether or not an absolute value of a value obtained by subtracting the steady valve closing timing IVCs from the transient valve closing timing IVCt is equal to or more than a first reference value R1 is determined. In other words, whether the difference between the transient valve closing timing IVCt and the steady valve closing timing IVCs is equal to or more than the first reference value R1 is determined. In a case where the difference between the transient valve closing timing IVCt and the steady valve closing timing IVCs is determined to be smaller than the first reference value R1, the control routine of FIG. 16 proceeds to Step S307. In Step S307, the target valve closing timing TIVC is set to the steady valve closing timing IVCs, the target mechanical compression ratio Tε is set to the steady compression ratio εs, and the valve closing timing setting flag F is set to zero. The control routine of FIG. 16 ends after Step S307.

On the other hand, In a case where the difference between the transient valve closing timing IVCt and the steady valve closing timing IVCs is determined to be equal to or more than the first reference value R1 in Step S306, the control routine of FIG. 16 proceeds to Step S308. In Step S308, the target valve closing timing TIVC is set to the transient valve closing timing IVCt, the target mechanical compression ratio Tε is set to the transient compression ratio εt, and the valve closing timing setting flag F is set to 1. The control routine of FIG. 16 ends after Step S308.

In a case where the valve closing timing setting flag F is determined to be set to 1 in Step S305, that is, in a case where the target valve closing timing TIVC is set to the transient valve closing timing IVCt in the previous control routine, the control routine of FIG. 16 proceeds to Step S309. In Step S309, whether or not an absolute value of a value obtained by subtracting the steady valve closing timing IVCs from the transient valve closing timing IVCt is equal to or less than a second reference value R2 is determined. In other words, whether the difference between the transient valve closing timing IVCt and the steady valve closing timing IVCs is equal to or less than the second reference value R2 is determined. The second reference value R2 is a value smaller than the first reference value R1.

In a case where the difference between the transient valve closing timing IVCt and the steady valve closing timing IVCs is determined to be larger than the second reference value R2 in Step S309, the control routine of FIG. 16 proceeds to Step S310. In Step S310, the target valve closing timing TIVC is set to the transient valve closing timing IVCt, the target mechanical compression ratio Tε is set to the transient compression ratio εt, and the valve closing timing setting flag F is set to 1. The control routine of FIG. 16 ends after Step S310.

On the other hand, In a case where the difference between the transient valve closing timing IVCt and the steady valve closing timing IVCs is determined to be equal to or less than the second reference value R2 in Step S309, the control routine of FIG. 16 proceeds to Step S307. In Step S307, the target valve closing timing TIVC is set to the steady valve closing timing IVCs, the target mechanical compression ratio Tε is set to the steady compression ratio εs, and the valve closing timing setting flag F is set to zero. The control routine of FIG. 16 ends after Step S307.

In the third embodiment, hysteresis is given to the control of the target valve closing timing TIVC and the target mechanical compression ratio Tε as mentioned above. For this reason, the target valve closing timing TIVC being frequently switched between the steady valve closing timing IVCs and the transient valve closing timing IVCt and the target mechanical compression ratio Tε being frequently switched between the steady compression ratio εs and the transient compression ratio εt, which is so called chattering can be suppressed.

Other Embodiments

Although the preferred embodiments have been described above, the invention is not limited to the above-described embodiments, and various modifications and changes can be made within the scope of the disclosure.

For example, the variable compression ratio mechanism may have arbitrary configurations as long as the mechanism is capable of changing the mechanical compression ratio. For example, the variable compression ratio mechanism may be a multi-link type piston stroke mechanism that changes the mechanical compression ratio by changing a top dead center position of a piston using the multi-link mechanism (refer to Japanese Unexamined Patent Application Publication No. 2005-69027 (JP 2005-69027 A), Japanese Unexamined Patent Application Publication No. 2001-227367 (JP 2001-227367 A), and the like).

The variable compression ratio mechanism may be a variable-length connecting rod (refer to Japanese Unexamined Patent Application Publication No. 2016-142137 (JP 2016-142137 A), Japanese Unexamined Patent Application Publication No. 2016-118180 (2016-118180), Japanese Unexamined Patent Application Publication No. 2015-527518 (JP 2015-527518 A, and the like) that changes the mechanical compression ratio by changing the effective length of a connecting rod (a distance between the center of a crankpin receiving opening that receives a crankpin and the center of a piston pin receiving opening that receives a piston pin). In a case where the variable compression ratio mechanism is capable of changing the mechanical compression ratio to solely two steps of a low compression ratio and a high compression ratio, the target mechanical compression ratio is set to the low compression ratio in the transient state, and the target mechanical compression ratio is set to the high compression ratio in the steady state.

The above-described embodiments can be arbitrarily combined and implemented. For example, Step S305 to Step S310 of FIG. 16 may be executed instead of Step S204 to Step S206 of FIG. 14. In this case, solely the target valve closing timing TIVC is set in Step S307, Step S308, and Step S310, and the target mechanical compression ratio Tε is set in Step S207 after Step S307, Step S308, or Step S310.

What is claimed is:

1. An internal combustion engine comprising:
   a turbocharger configured to be driven by exhaust gas to increase intake pressure;
   a variable valve timing mechanism configured to change a valve closing timing of an intake valve;
   a variable compression ratio mechanism configured to change a mechanical compression ratio of the internal combustion engine; and
   an electronic control unit configured to control the variable compression ratio mechanism such that the mechanical compression ratio becomes a target mechanical compression ratio and to control the variable valve timing mechanism such that the valve closing timing becomes a target valve closing timing,
   wherein the electronic control unit is configured to bring the target valve closing timing close to an intake bottom dead center and make the target mechanical compression ratio low, compared to a steady state after the intake pressure reaches a target pressure, in a transient state before the intake pressure reaches the target pressure in a case where the intake pressure is increased to the target pressure higher than an atmospheric pressure by the turbocharger.

2. The internal combustion engine according to claim 1, wherein:
   the electronic control unit is configured to calculate a steady valve closing timing that is a target value of the valve closing timing of the intake valve in the steady state, and a transient valve closing timing that is a target value of the valve closing timing of the intake valve in the transient state; and
   the electronic control unit is configured to calculate the target valve closing timing based on the steady valve closing timing and the transient valve closing timing.

3. The internal combustion engine according to claim 2, wherein the electronic control unit is configured to calculate the transient valve closing timing based on the intake pressure, an engine speed, and a target engine load rate.

4. The internal combustion engine according to claim 2, wherein:
   the electronic control unit is configured to calculate a steady compression ratio that is a target value of the mechanical compression ratio in the steady state, and a transient compression ratio that is a target value of the mechanical compression ratio in the transient state; and
   the electronic control unit is configured to calculate the target mechanical compression ratio based on the steady compression ratio and the transient compression ratio.

5. The internal combustion engine according to claim 4, wherein the electronic control unit is configured to calculate the transient compression ratio based on the transient valve closing timing, the intake pressure, and an engine speed.

6. The internal combustion engine according to claim 2, wherein the electronic control unit is configured to calculate the target mechanical compression ratio based on the target valve closing timing, an engine speed, and a target engine load rate.

7. The internal combustion engine according to claim 2, wherein:
   the electronic control unit is configured to set the target valve closing timing to the transient valve closing timing when a difference between the transient valve closing timing and the steady valve closing timing becomes equal to or more than a first reference value; and
   the electronic control unit is configured to switch the target valve closing timing from the transient valve closing timing to the steady valve closing timing when the difference becomes equal to or less than a second reference value smaller than the first reference value.

* * * * *